United States Patent
Bellert

(10) Patent No.: US 10,452,952 B2
(45) Date of Patent: Oct. 22, 2019

(54) TYPESETNESS SCORE FOR A TABLE

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 217 days.

(21) Appl. No.: 15/638,860

(22) Filed: Jun. 30, 2017

(65) Prior Publication Data

US 2019/0005352 A1  Jan. 3, 2019

(51) Int. Cl.
| | | |
|---|---|---|
| G06K 9/62 | (2006.01) | |
| G06K 9/00 | (2006.01) | |
| G06K 9/32 | (2006.01) | |
| G06K 9/46 | (2006.01) | |
| G06F 16/28 | (2019.01) | |
| G06F 16/901 | (2019.01) | |

(52) U.S. Cl.
CPC .......... *G06K 9/6211* (2013.01); *G06F 16/287* (2019.01); *G06F 16/9024* (2019.01); *G06K 9/00449* (2013.01); *G06K 9/3208* (2013.01); *G06K 9/4604* (2013.01); *G06K 9/6215* (2013.01); *G06K 9/6218* (2013.01)

(58) Field of Classification Search
CPC .. G06K 9/6211; G06K 9/6218; G06K 9/6215; G06K 9/4604; G06K 9/00449; G06K 9/3208; G06F 16/287; G06F 16/9024
See application file for complete search history.

(56) References Cited

U.S. PATENT DOCUMENTS

| | | | | |
|---|---|---|---|---|
| 5,448,692 A | * | 9/1995 | Ohta | G06K 9/00449 382/197 |
| 2007/0140566 A1 | * | 6/2007 | Lin | G06K 9/00416 382/203 |
| 2009/0245645 A1 | * | 10/2009 | Xing | G06F 17/245 382/189 |
| 2011/0007970 A1 | * | 1/2011 | Saund | G06K 9/00449 382/176 |
| 2017/0148140 A1 | | 5/2017 | Bellert | |
| 2017/0351913 A1 | * | 12/2017 | Chen | G06K 9/00449 |

OTHER PUBLICATIONS

Extended European Search Report issued in corresponding European Patent Application 18168452.3 dated Oct. 25, 2018 (10 pages).

* cited by examiner

*Primary Examiner* — Phuoc Tran

(74) *Attorney, Agent, or Firm* — Osha Liang LLP

(57) ABSTRACT

A method for image processing is provided. The method includes: obtaining an image including a table; generating, for the table, a skeleton graph including a plurality of edges; identifying a plurality of angles and a plurality of lengths for the plurality of edges; and calculating a typesetness score that compares the table to a template table based on the plurality of angles and the plurality of lengths.

17 Claims, 7 Drawing Sheets

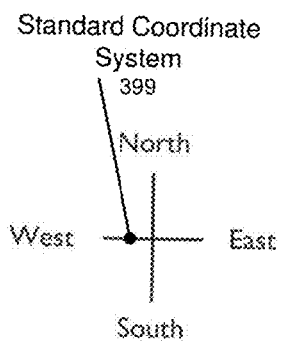
Standard Coordinate System 399
FIG. 3A
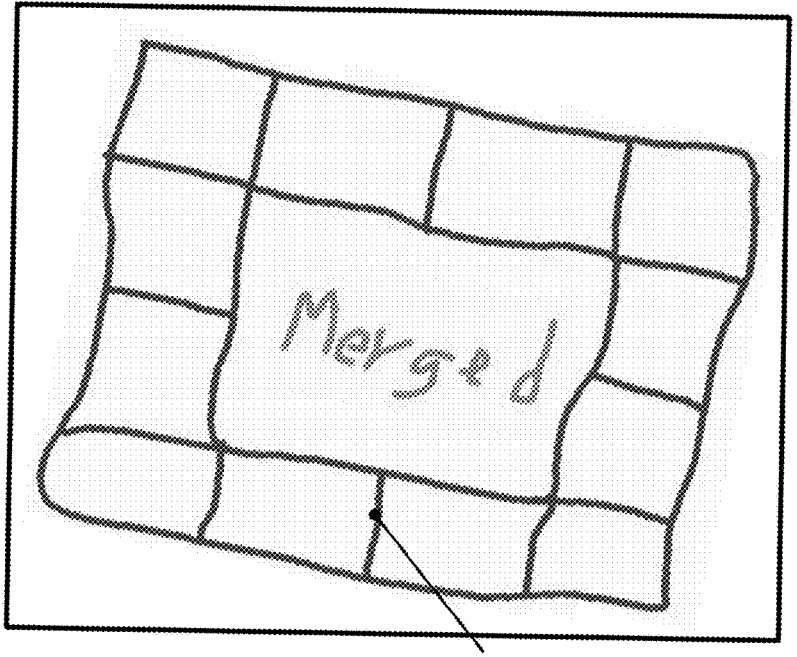
Image 306
Hand-drawn Table 308
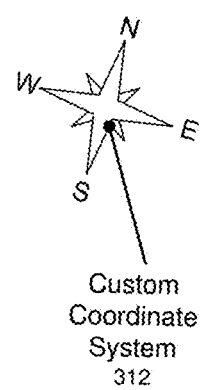
Custom Coordinate System 312
FIG. 3B
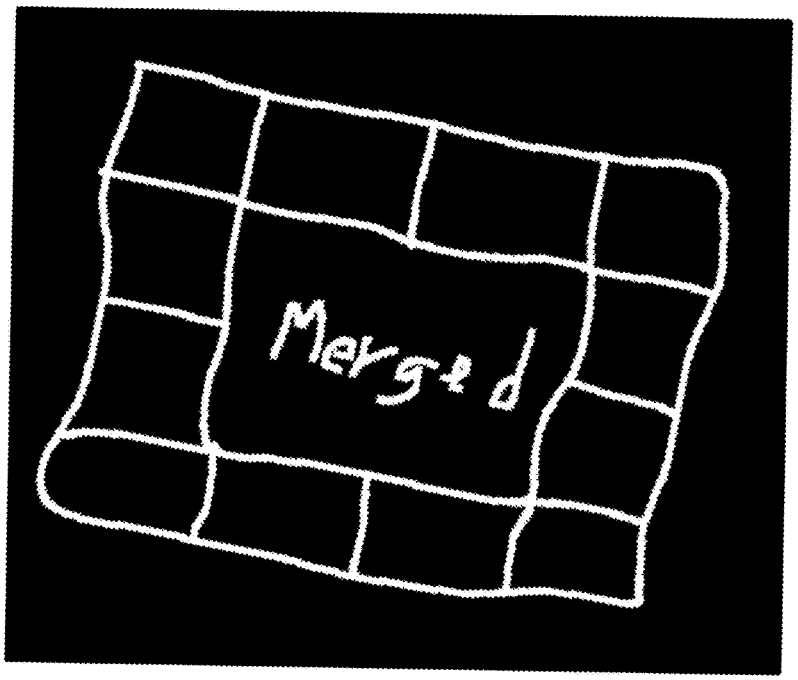
Image (Following conversion to mask) 310

Hand-drawn Table
402

Cluster Lengths
404

Clusters
406

Histogram
403

Computer-drawn table 502

Cluster Lengths 504
Clusters 506
Histogram 503

TYPESETNESS SCORE FOR A TABLE

BACKGROUND

An image may include a table with rows and columns bounded by hand-drawn lines. For example, the image may be a scan of a hand-drawn page or a photograph of a writing board on which the table is hand-drawn with markers. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables or any table in an image.

SUMMARY

In general, in one aspect, the invention relates to a method for image processing. The method comprises: obtaining an image comprising a table; generating, for the table, a skeleton graph comprising a plurality of edges; identifying a plurality of angles and a plurality of lengths for the plurality of edges; and calculating a typesetness score that compares the table to a template table based on the plurality of angles and the plurality of lengths.

In general, in one aspect, the invention relates to a non-transitory computer readable medium (CRM) storing computer readable program code embodied therein. The code, when executed: stores an image comprising a table; generates, for the table, a skeleton graph comprising a plurality of edges; identifies a plurality of angles and a plurality of lengths for the plurality of edges; and calculates a typesetness score that compares the table to a template table based on the plurality of angles and the plurality of lengths.

In general, in one aspect, the invention relates to a system for image processing. The system comprises: a memory; a computer processor connected to the memory that: stores an image comprising a table; generates, for the table, a skeleton graph comprising a plurality of edges; identifies a plurality of angles and a plurality of lengths for the plurality of edges; and calculates a typesetness score that compares the table to a template table based on the plurality of angles and the plurality of lengths.

Other aspects of the invention will be apparent from the following description and the appended claims.

BRIEF DESCRIPTION OF DRAWINGS

FIGS. 3A-3C show an implementation example in accordance with one or more embodiments of the invention.

DETAILED DESCRIPTION

Figure 1:
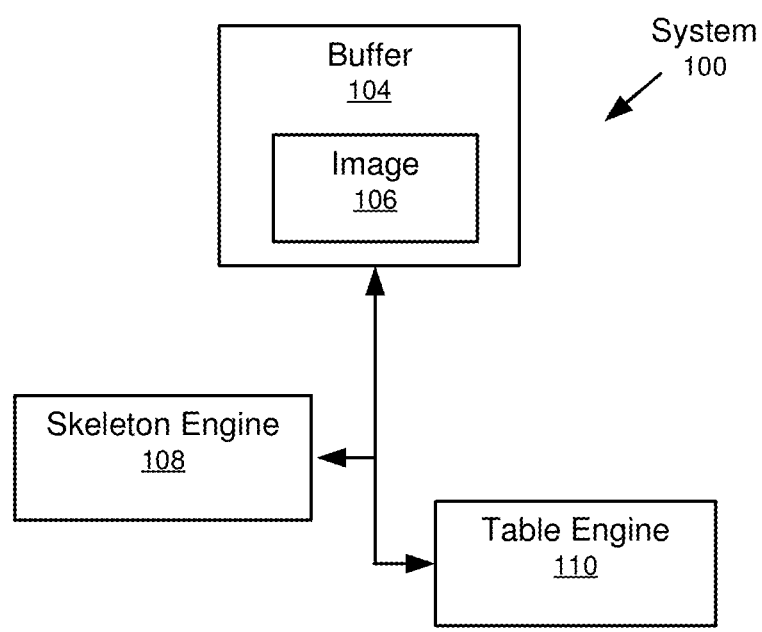
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. Specifically, an image including a table with hand-drawn lines (e.g., marker or pen strokes) is obtained and a skeleton for the table ("table skeleton") is generated. The skeleton includes edges and vertices representing the table. A typesetness score for the table is calculated based on the length and angle of each edge. The typesetness score is a measure of how closely the hand-drawn table resembles a template table (e.g., theoretical or ideal table) having rows and columns formed by straight lines with perpendicular intersections. In other words, the typesetness score is a comparison of the table with the template table. For example, the typesetness score may range between 0 and 1, with a typesetness score of 0.98 indicating a near perfect match between the hand-drawn table and the template table. Once calculated, the typesetness score may be used to tighten or loosen certain tolerances in various processes used to generate a high-level representation of the hand-drawn table for inclusion in an electronic document (e.g., an OOXML document, a PDF document, etc.).

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the system (100) includes the buffer (104). The buffer (104) may be implemented in hardware (i.e., circuitry), software, or any combination thereof. The buffer (104) is configured to store an image (106) including a table having any number of rows and columns. Each cell of the table may have text and/or graphics. In one or more embodiments, the table in the image (106) is hand-drawn. Accordingly, the hand-drawn lines bounding the rows and columns of the table might not be perfectly horizontal or perfectly vertical. Alternatively, the table may be computer-drawn. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the hand-drawn table is drawn on the writing board with a marker.

In one or more embodiments of the invention, the system (100) includes the skeleton engine (108). The skeleton engine (108) may be implemented in hardware (i.e., circuitry), software, or any combination thereof. The skeleton engine (108) converts the image (106) to a mask (e.g., a binary image) to help identify the rows and columns of the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Additionally or alternatively, the table may be rotated to better align the rows and columns of the table with the standard coordinate system of the image (106).

In one or more embodiments of the invention, the skeleton engine (108) generates a skeleton graph for the table in the image (106). The skeleton graph includes a series of edges and vertices that represent the hand-drawn table. Each edge may correspond to a stroke, or a portion of a stroke, of the table and each vertex may correspond to an intersection of two or more edges. In other words, the edges are separated by the vertices. Further, an edge may contain a path of pixels from one end of the stroke to the other end of the stroke, located approximately at the center of the stroke. In one or more embodiments, the width of the path is 1 pixel. In one or more embodiments of the invention, the width of the path is multiple pixels.

In one or more embodiments, the skeleton engine (108) also identifies an angle for each edge and the length of each edge. The length of an edge may be calculated as the Euclidean distance between the two terminal ends of the edge. Additionally or alternatively, the length may also be identified by counting the number of pixels within the edge's path of pixels. The angle of an edge may be calculated as the angle between an axis (e.g., x-axis, y-axis, etc.) of the custom coordinate system and a line that passes through the two terminal ends of the edge. In one or more embodiments of the invention, the angle of an edge may be rounded to the nearest degree between the range of 0 degrees to 179 degrees.

In one or more embodiments of the invention, the system (100) includes the table engine (110). The table engine (110) may be implemented in hardware (i.e., circuitry), software, or any combination thereof. The table engine (110) is configured to calculate a typesetness score of the table in the image (106). In other words, the table engine (110) is configured to determine how closely the table resembles a template table (e.g., a theoretical table) having rows and columns formed by straight lines. The typesetness score is a comparison of the table with the template table. As discussed above, the typesetness score may range from 0 to 1, with 1 indicating a perfect match between the table and the template table.

In one or more embodiments, calculating the typesetness score includes grouping edges with similar angles into clusters (e.g., bins). Then, a cluster length is calculated for each cluster. The cluster length for a cluster is the sum of the lengths of the edges in the cluster. A sum of the N largest cluster lengths is calculated. The total sum of the lengths of all edges from all clusters is also calculated. The typesetness score may correspond to the ratio of the sum of the N largest cluster lengths to the total sum of the lengths of all edges. For example, N may equal 2 or 3. N may take on other values as well. Calculating the typesetness score is described below in reference to FIG. 2.

In one or more embodiments, the table engine (110) generates a high-level representation for the table for inclusion in the markup of an electronic document (e.g., OOXML document, PDF document, etc.). For example, the electronic document may correspond to an OOXML document, and the high-level representation may include tags with attributes needed to correctly render (i.e., display, print, etc.) the table. The typesetness score may be used to tighten or loosen certain tolerances in various processes used to generate the high-level representation of the table.

In one or more embodiments of the invention, any edge that is shorter than a minimum threshold length value may be discarded from further consideration. The minimum threshold length value may be computed as twice the average width, in pixels, of all strokes in the table.

In one or more embodiments, the table engine (110) generates and displays one or more histograms in which one axis corresponds to the clusters and the other axis corresponds to the summed edge lengths in the clusters. The histogram provides a visual representation to a user of how close the table is to the template table.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2:
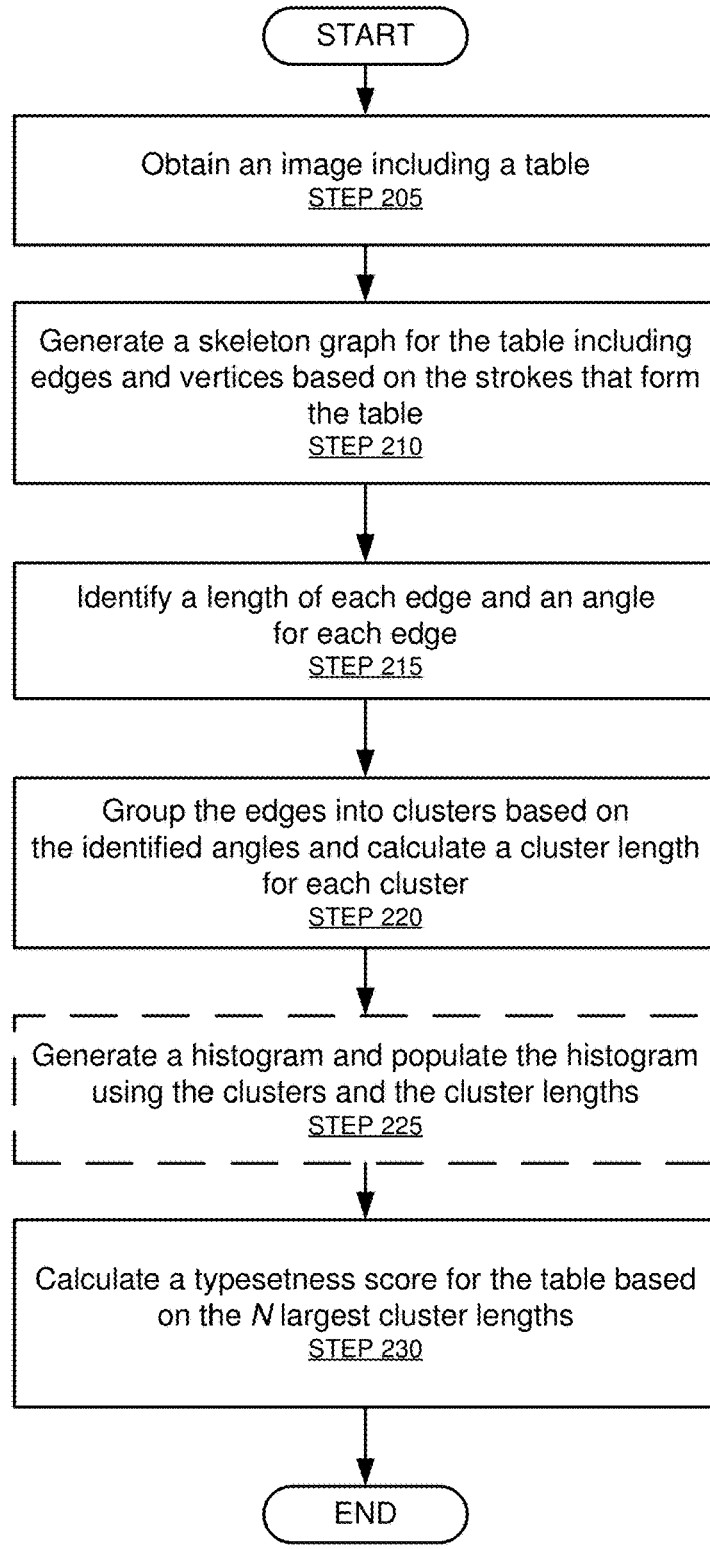
FIG. 2 shows a flowchart in accordance with one or more embodiments of the invention.

FIG. 2 shows a flowchart in accordance with one or more embodiments of the invention. The flowchart depicts a process for image processing. Specifically, the flowchart depicts a process for calculating a typesetness score of a table. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image including a table is obtained (STEP 205). The image may be obtained (e.g., downloaded, scanned, etc.) from any source and may be of any size or format. For example, the image may include a writing board and the table is hand-drawn on the writing board. Additionally or alternatively, the image may be a scan of a hardcopy document, where the table is visible in the hardcopy document and the table was computer-generated. Due to the nature of strokes drawn by hand and/or errors introduced during the scanning process, the rows and columns of the table are unlikely to be bounded by perfectly straight strokes.

In one or more embodiments of the invention, the image is converted into a mask (e.g., a binary image) to identify each stroke of the table and/or text characters in the table. Pixels corresponding to the strokes of the table may be set to 1, while all remaining pixels are set to 0. Further, the custom coordinate system, as described above in reference to FIG. 1, is established for the table. Alternatively, the table may be rotated to better align the rows and columns of the table with the standard coordinate system of the image.

In STEP 210, a skeleton graph is generated for the table. As discussed above, the skeleton graph may include sets of edges and vertices that represent the table. Each edge may correspond to a stroke, or a portion of a stroke, of the table and each vertex may correspond to an intersection of two or more edges. In other words, the vertices separate edges.

In STEP 215, an angle for each edge and the length of each edge are identified. The length of an edge may correspond to the Euclidean distance between the terminal ends of the edge. The angle of the edge may correspond to the angle between an axis (e.g., x-axis, y-axis, etc.) and a line that passes through both terminal ends of the edge.

In STEP 220, the edges are grouped into clusters based on their angles (e.g., angle bins). For example, all edges with angles between 2 degrees and 3 degrees may be grouped into the same cluster. As another example, all edges with angles between 89.5 degrees and 90.5 degrees may be grouped into the same cluster. Then, a cluster length for each cluster is calculated. For example, assume a cluster has edges: $E_1$, $E_2$, $E_3$, . . . , $E_K$. The cluster length for the cluster would be calculated as length of $E_1$+length of $E_2$+length of $E_3$+ . . . +length of $E_K$.

In STEP 225, a histogram is generated and populated with the clusters on one axis and the cluster lengths on the other axis. In one or more embodiments, STEP 225 is optional. The histogram provides a visual representation to a user of how close the table is to the template table.

In STEP 230, a typesetness score for the table is calculated using cluster lengths and the total sum of all lengths of all edges. Specifically, the typesetness score may be a ratio of the N largest cluster lengths to the total sum. If N=2, typesetness score=($CL_1$+$CL_2$)/(total sum of all lengths of all edges), wherein $CL_1$ and $CL_2$ are the two largest cluster lengths.

Those skilled in the art, having the benefit of this detailed description, will appreciate that if the hand-drawn table closely resembles the template table (i.e., a theoretical table with perfectly straight lines that intersect at 90 degrees), most of the edges will have an angle of 0 degrees or 90 degrees. Accordingly, the cluster that includes zero degrees and the cluster that includes 90 degrees will have the largest cluster lengths. Moreover, since these two clusters include most (possibly all) of the edges, the sum of the cluster lengths for these two clusters will almost equal the sum of all lengths of all edges. Thus, the typesetness score will be close to 1 for such a table.

Although not shown in FIG. 2, following STEP 230, the typesetness score may be used to adjust various tolerances in the various processes that generate a high-level representation of the table for inclusion in an electronic document (e.g., OOXML document, PDF document, etc.).

Figure 3C:
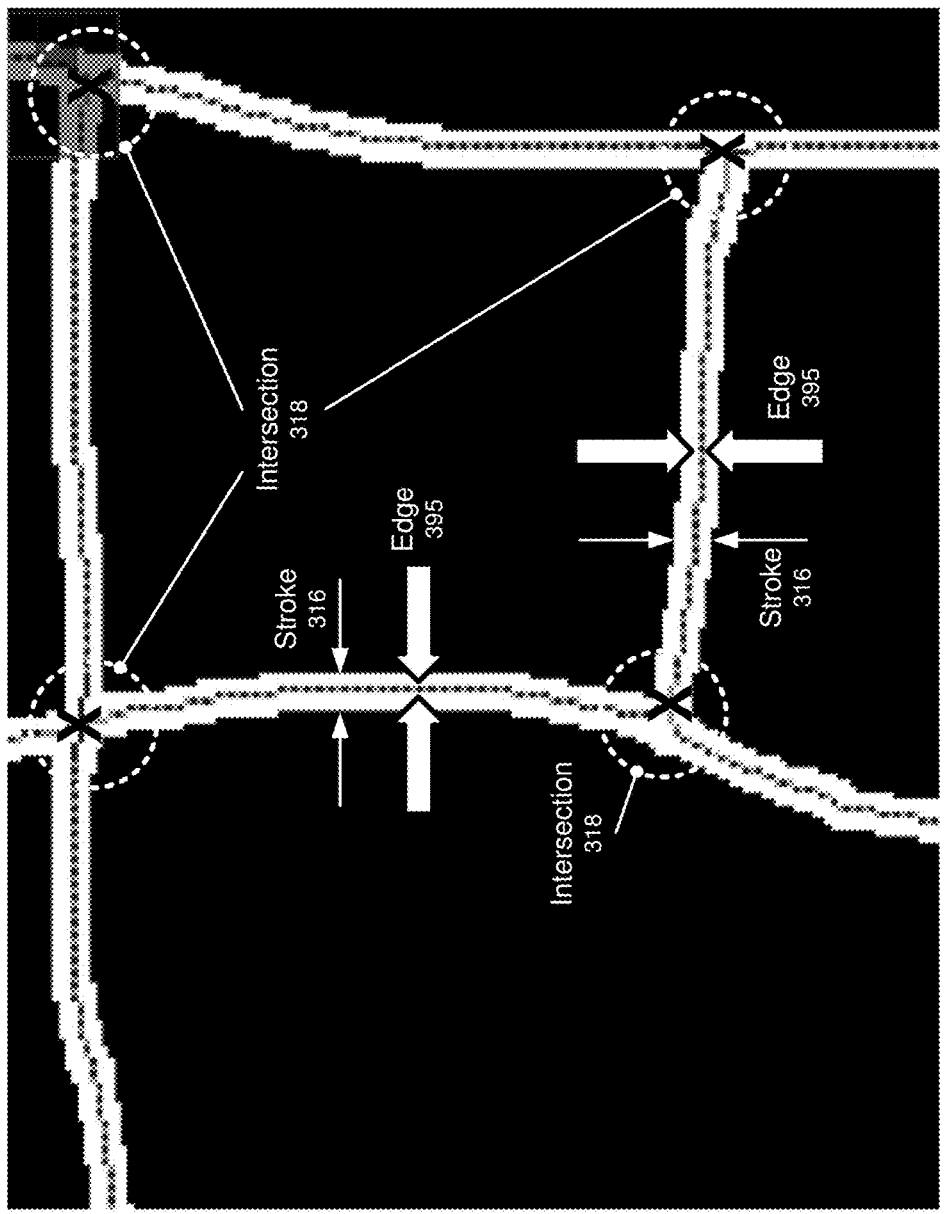

FIGS. 3A-3C show an implementation example in accordance with one or more embodiments of the invention. As shown in FIG. 3A, there exists an image (306) with a hand-drawn table (308). Specifically, the table (308) includes hand-drawn stokes that form the rows and columns. One or more cells of the table (308) may include text. The hand-drawn table (308) may be drawn at an angle. In other words, the table (308) is not aligned with the standard coordinate system (399) for the image (306).

FIG. 3B shows the image (310) after it has been converted to a mask. Moreover, a custom coordinate system (312) has been established. This custom coordinate system (312) has axes that are better align with the rows and columns of the table (308) than the standard coordinate system (399).

FIG. 3C shows a partial skeleton graph (314) for the table. As shown in FIG. 3C, the rows and columns of the table are formed by multiple hand-drawn strokes (316). The skeleton graph (314) includes a set of edges (395) and vertices that represent the hand-drawn table. Each edge (395) corresponds to a stroke (316), or a portion of a stroke, of the hand-drawn table and each vertex may correspond to an intersection (318) of two or more edges (395). In other words, the edges (395) are separated by the vertices. Further, each edge (395) contains a path of pixels from one end of the stroke (316) to the other end of the stroke (316), located approximately at the center of the stroke. In FIG. 3C, the width of the path/edge is 1 pixel.

Figures 4A, 4B:
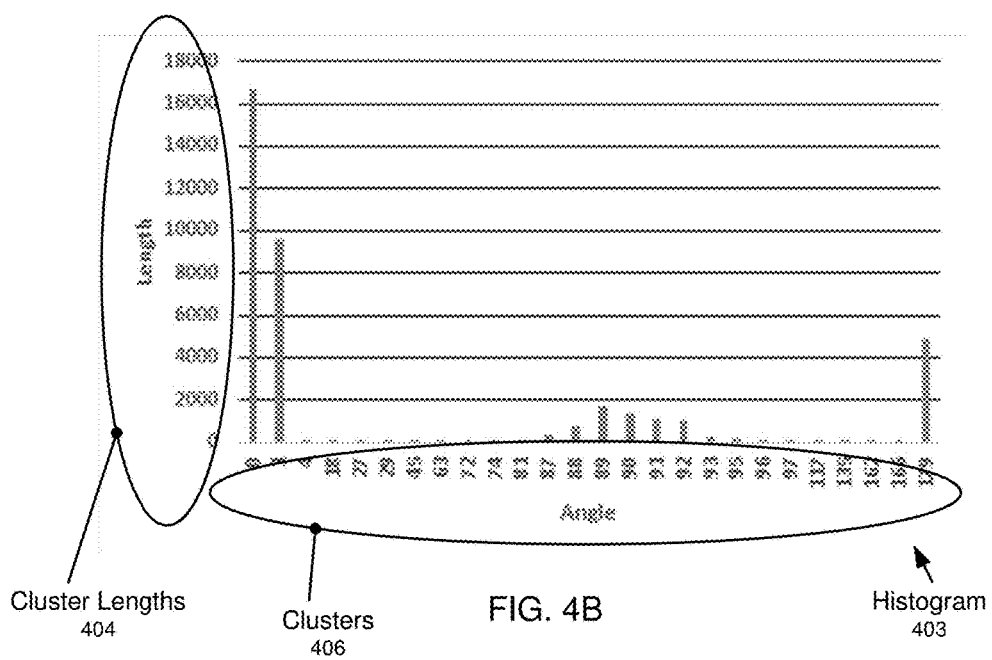
FIGS. 4A and 4B show an implementation example in accordance with one or more embodiments of the invention.

FIGS. 4A and 4B show an implementation example in accordance with one or more embodiments of the invention.

FIG. 4A shows the mask and skeleton graph of a hand-drawn table (402) similar to the image (310) and skeleton graph (314) of hand-drawn table (308), as discussed above in reference to FIGS. 3A-3C. The method of determining the typesetness score of a hand-drawn table, as discussed above in reference to FIG. 2, is applied to the hand-drawn table (402).

FIG. 4B shows a histogram (403) as described above in reference to FIG. 2. The histogram (403) is generated after determining the angle for each edge and the length for each edge of the skeleton graph for the hand-drawn table (402). The x-axis of the histogram (403) corresponds to the clusters (406) of edges. Specifically, each cluster has edges with the same or similar angles. The y-axis of the histogram (403) corresponds to the cluster lengths (404) for each cluster (406). As discussed above, the cluster length for a cluster is the sum of the lengths of the edges in the cluster.

Assume, for the example of FIG. 4A and FIG. 4B, that only the top two cluster lengths (i.e., N=2) are used to calculate the typesetness score for the hand-drawn table (402). As shown in FIG. 4B, the top two cluster lengths are associated with edges having angles that equal (or approximately equal) 0 or 1 degrees. The sum of these top two cluster lengths is 26,297. The total sum of the lengths of all edges from all clusters is 38,523. Accordingly, the typesetness score for the hand-drawn table (402) is 26297/38523=0.68.

Figures 5A, 5B:
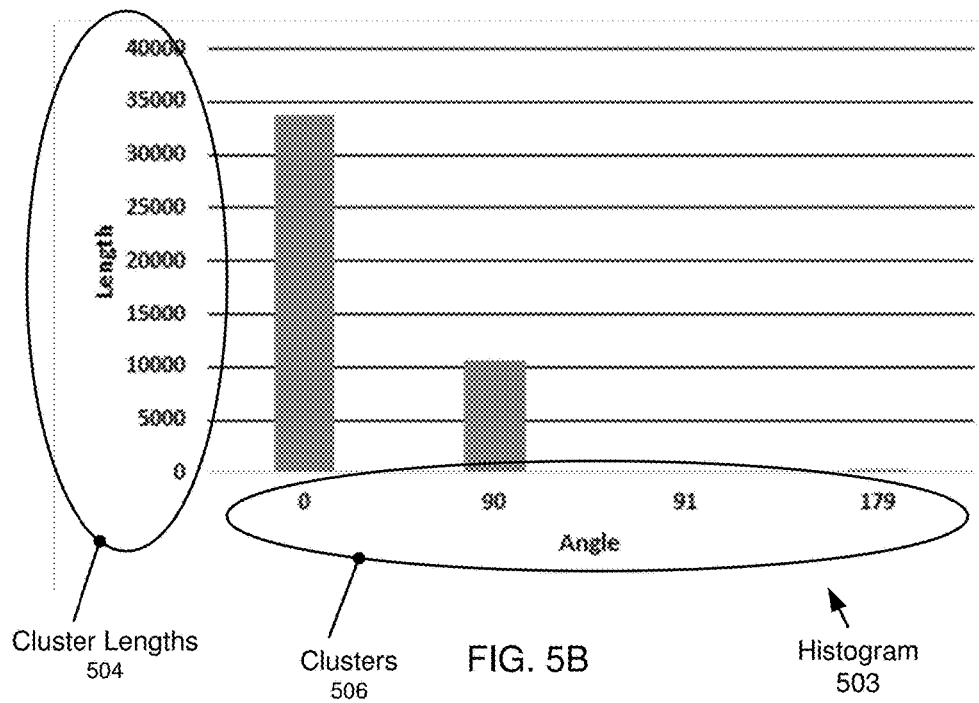
FIGS. 5A and 5B show an implementation example in accordance with one or more embodiments of the invention.

FIGS. 5A and 5B show an implementation example in accordance with one or more embodiments of the invention.

FIG. 5A shows the mask and skeleton graph for an image with a table (502). The image is a scan of a hardcopy document (i.e., table (502) was visible in the hardcopy document). Unlike the table of FIG. 4A, the table (502) was generated by a computer and thus closely matches the template table.

FIG. 5B shows a histogram (503), as described above in reference to FIG. 2, for table (502). The histogram (503) is generated after determining the angle for each edge and the length for each edge in the skeleton graph for the table (502). The x-axis of the histogram (503) corresponds to the clusters (506) of edges. Specifically, each cluster has edges with the same or similar angles. The y-axis of the histogram (503) corresponds to the cluster lengths (504) for each cluster (506). As discussed above, the cluster length for a cluster is the sum of the lengths of the edges in the cluster.

Assume, for the example of FIG. 5A and FIG. 5B, that only the top two cluster lengths (i.e., N=2) are used to calculate the typesetness score for the table (502). As shown in FIG. 5B, the top two cluster lengths are associated with edges having angles that equal (or approximately equal) 0 or 90 degrees. The sum of these top two cluster lengths is 44,349. The total sum of the lengths of all edges from all clusters is 44,762. Accordingly, the typesetness score for the hand-drawn table (502) is 44349/44762=0.99. Not surprisingly, this is a near perfect match with the template table. In fact, the error(s) are most likely due to blurring during the scanning process.

Figure 6:
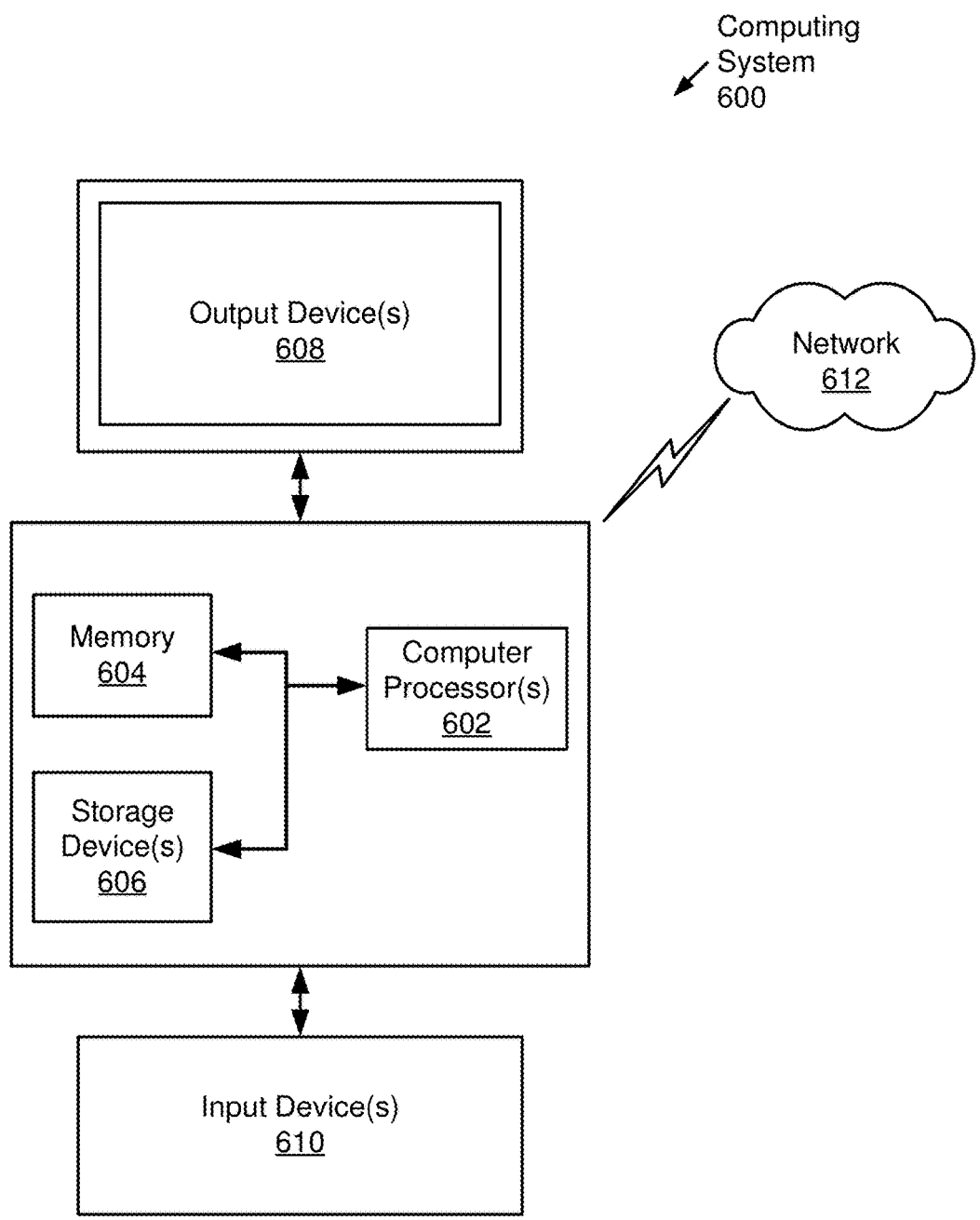
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining an image comprising a table;
   generating, for the table, a skeleton graph comprising a plurality of edges;
   identifying a plurality of angles and a plurality of lengths for the plurality of edges; and
   calculating a typesetness score that compares the table to a template table based on the plurality of angles and the plurality of lengths, wherein
   calculating the typesetness score comprises:
      grouping the plurality of edges into a plurality of clusters based on the plurality of angles;
      calculating a plurality of cluster lengths for the plurality of clusters based on the plurality of lengths;
      selecting a subset of the plurality of cluster lengths; and
      calculating a ratio of a sum of the subset to a sum of the plurality of lengths.

2. The method of claim 1, wherein the subset consists of the two largest cluster lengths of the plurality of cluster lengths.

3. The method of claim 1, wherein the length of an edge of the plurality of edges is the Euclidean distance between the terminal ends of the edge.

4. The method of claim 3, wherein the angle of the edge is the angle between the x-axis and a line that passes through the two terminal ends of the edge.

5. The method of claim 4, wherein the x-axis is an axis in a rotated custom coordinate system.

6. The method of claim 1, further comprising:
   generating a histogram comprising a first axis corresponding to the plurality of clusters and a second axis corresponding to the plurality of cluster lengths; and
   displaying the histogram.

7. The method of claim 1, wherein the image comprises a writing board and the table is hand-drawn on the writing board.

8. The method of claim 1, further comprising:
   converting the image into a mask before generating the skeleton graph.

9. A non-transitory computer readable medium (CRM) storing computer readable program code embodied therein that:
   stores an image comprising a table;
   generates, for the table, a skeleton graph comprising a plurality of edges;
   identifies a plurality of angles and a plurality of lengths for the plurality of edges; and
   calculates a typesetness score that compares the table to a template table based on the plurality of angles and the plurality of lengths, wherein
   calculating the typesetness score comprises:
      grouping the plurality of edges into a plurality of clusters based on the plurality of angles;
      calculating a plurality of cluster lengths for the plurality of clusters based on the plurality of lengths;
      selecting a subset of the plurality of cluster lengths; and
      calculating a ratio of a sum of the subset to a sum of the plurality of lengths.

10. The non-transitory CRM of claim 9, wherein the subset consists of the two largest cluster lengths of the plurality of cluster lengths.

11. The non-transitory CRM of claim 9, wherein the length of an edge of the plurality of edges is the Euclidean distance between the terminal ends of the edge.

12. The non-transitory CRM of claim 11, wherein the angle of the edge is the angle between the x-axis and a line that passes through the two terminal ends of the edge.

13. The non-transitory CRM of claim 9, wherein the image comprises a writing board and the table is hand-drawn on the writing board.

14. A system for image processing, comprising:
a memory; and
a computer processor connected to the memory that:
   stores an image comprising a table;
   generates, for the table, a skeleton graph comprising a plurality of edges;
   identifies a plurality of angles and a plurality of lengths for the plurality of edges; and
   calculates a typesetness score that compares the table to a template table based on the plurality of angles and the plurality of lengths, wherein
calculating the typesetness score comprises:
   grouping the plurality of edges into a plurality of clusters based on the plurality of angles;
   calculating a plurality of cluster lengths for the plurality of clusters based on the plurality of lengths;
   selecting a subset of the plurality of cluster lengths; and
   calculating a ratio of a sum of the subset to a sum of the plurality of lengths.

15. The system of claim 14, wherein the subset consists of the two largest cluster lengths of the plurality of cluster lengths.

16. The system of claim 14, wherein:
   the length of an edge of the plurality of edges is the Euclidean distance between the terminal ends of the edge; and
   the angle of the edge is the angle between the x-axis and a line that passes through the two terminal ends of the edge.

17. The system of claim 14, wherein the image comprises a writing board and the table is hand-drawn on the writing board.

* * * * *